United States Patent [19]

Johannessen

[11] Patent Number: 4,879,419

[45] Date of Patent: Nov. 7, 1989

[54] HYDROXYL-TERMINATED POLYEPICHLOROHYDRIN POLYMERS

[75] Inventor: Birger Johannessen, St. Paul, Minn.

[73] Assignee: Minnesota Mining and Manufacturing Company, St. Paul, Minn.

[21] Appl. No.: 750,910

[22] Filed: Jul. 1, 1985

[51] Int. Cl.$^4$ .................. C07C 43/12; C07C 43/11; C08G 65/24; C08G 59/68

[52] U.S. Cl. .................. 568/606; 252/182.27; 528/403; 528/409; 528/421; 568/607; 568/614; 568/618; 568/620

[58] Field of Search .................. 252/182; 525/403; 568/606, 607, 614, 618, 620; 528/409, 421; 260/349

[56] References Cited

U.S. PATENT DOCUMENTS

| | | | |
|---|---|---|---|
| 2,327,053 | 8/1943 | Marple et al. | 260/611 |
| 2,380,185 | 7/1945 | Marple et al. | 260/615 |
| 3,305,565 | 2/1967 | Mueller | 525/403 |
| 3,415,902 | 12/1968 | Hickner et al. | 568/614 |
| 3,558,722 | 1/1971 | Kobayashi et al. | 568/614 |
| 3,636,163 | 1/1972 | Jenkner et al. | 568/614 |
| 3,642,705 | 2/1972 | Zollinger | 260/77.5 AP |
| 3,875,189 | 4/1975 | Petty | 149/109.4 |
| 4,072,638 | 2/1978 | Boulet et al. | 568/614 |
| 4,268,450 | 5/1981 | Frankel et al. | 260/349 |
| 4,288,262 | 9/1981 | Flanagan et al. | 149/19.6 |
| 4,340,749 | 7/1982 | Patel | 560/182 |
| 4,379,894 | 4/1983 | Frankel et al. | 525/403 |
| 4,391,970 | 7/1983 | Okamoto | 528/408 |
| 4,391,994 | 7/1983 | Kogoma et al. | 568/614 |
| 4,405,497 | 9/1983 | Young et al. | 252/431 R |
| 4,431,845 | 2/1984 | Young et al. | 568/606 |
| 4,486,351 | 12/1984 | Earl | 260/349 |
| 4,490,560 | 12/1984 | Yu et al. | 568/614 |
| 4,511,742 | 4/1985 | Yu | 568/614 |

FOREIGN PATENT DOCUMENTS

| | | | |
|---|---|---|---|
| 872106 | 7/1961 | United Kingdom | 568/614 |
| 2021606 | 12/1979 | United Kingdom | 568/614 |

OTHER PUBLICATIONS

E. J. Geothals, *Adv. Polym. Sci.*, 23, 104 (1977).
W. Huber, "Titration in Nonaqueous Solvents", Acadamic Press, New York, NY, 1967, pp. 215–217.

*Primary Examiner*—Edward A. Miller
*Attorney, Agent, or Firm*—Donald M. Sell; Walter N. Kirn; W. G. Ewert

[57] ABSTRACT

Hydroxyl terminated polyepichlorohydrin having a polydispersity of less than 1.2 and a molecular weight of at least 2000, and method of preparation using stannic chloride and strong carboxylic acid co-catalysts.

11 Claims, No Drawings

HYDROXYL-TERMINATED POLYEPICHLOROHYDRIN POLYMERS

This invention relates to hydroxyl-terminated polymers of epichlorohydrin and their preparation. In another aspect, it relates to azide derivatives of said polymers. In another aspect, it relates to polyurethanes of said epichlorohydrin polymers and their azide derivatives. In a still further aspect, it relates to solid rocket propellants using as a binder a polyurethane prepared from glycidyl azide polymers derived from polyepichlorohydrin.

The acid-catalyzed (or cationic) ring-opening or polymerization of epichlorohydrin in the presence of initiators, mainly hydroxyl-containing molecules, e.g., water or alcohols (including polyols), to yield hydroxylterminated epichlorohydrin derivatives, is known. U.S. Pat. Nos. 4,340,749 (Patel), 4,391,970 (Okamoto) and 4,431,845 (Young et al) describe some recent improvements. The first reference discloses the reaction of fluoroaliphatic alcohols with epichlorohydrin, and use of stannic chloride as a catalyst, to prepare fluoroaliphatic, hydroxyl-terminated epichlorohydrins containing more than 25 wt. % carbon-bonded fluorine. The other two references disclose polymerization of epichlorohydrin in the presence of water or a hydroxyl material (e.g. ethylene glycol) and a catalyst (in the Young et al patent, a fluorinated acid and a polyvalent organo tin compound such as diphenyldibutyl tin). Other art is U.S. Pat. Nos. 2,327,053 (Marple et al) and 2,380,185 (Marple et al) which disclose reacting epichlorohydrin with an excess of hydroxy compounds, such as isopropyl alcohol, in the presence of a metal halide, such as stannic chloride, to produce mono-adducts rather than polymers. When known catalysts are used in concentrations to provide complete conversion in a short reaction period, the product is typically dark color.

Although the hydroxyl-terminated polyepichlorohydrin polyols prepared following the procedures described in some of the art produce polymer products which are useful in some applications, they generally contain undesirable amounts, e.g. up to 10 to 20 weight percent, of low molecular weight, non-hydroxyl functional, cyclic ether oligomers (comprising 2 or 4 epichlorohydrin units) as impurities or by-products which increase in amount as the molecular weight of the polyepichlorohydrin product increases. The formation of cyclic oligomers is unfortunately characteristic of cationic ring-opening polymerizations of cyclic ethers (E. J. Geothals, *Adv. Polym. Sci.*, 23, 104 (1977)), and time-consuming fractionation or extraction of the products may have to be used if one desires to remove such impurities from the polymerizate. Furthermore, prior art methods often result in polyepichlorohydrin polymer products having relatively high polydispersity (the ratio of weight average molecular weight, $\overline{MHD}\ w$, to number average molecular weight, $\overline{MHD}\ n$), which means, for example, that polyurethanes prepared from such products generally will not have physical properties of desired values.

Azide derivatives of hydroxyl-terminated polyepichlorohydrin polymers, i.e. glycidyl azide polymers prepared by reaction of such polyepichlorohydrins with inorganic azide, have been proposed in preparing energetic binders for solid propellants (see, for example, U.S. Pat. Nos. 4,268,450 (Frankel et al) and 4,486,351 (Earl)). The presence of the oligomer impurities in the glycidyl azide polyol derivatives detracts from the physical properties of the propellant binders prepared from them.

This invention provides, in one aspect, a process for the preparation of novel polyepichlorohydrin product comprising predominately secondary hydroxyl-terminated polyepichlorohydrin polymer by the polymerization of epichlorohydrin in the presence of anhydrous stannic chloride, $SnCl_4$, as a polymerization catalyst, and, as an initiator, an alcohol, preferably an organic polyol, which is unreactive with the catalyst, and, preferably, a strong carboxylic acid (i.e., one having a $pK_a$ of less than about 2, preferably less than about 1) as a co-catalyst, such as trifluoroacetic acid or trichloroacetic acid. The polyepichlorohydrin polymer preferably has epichlorohydrin (or chloromethylethyleneoxy) units as essentially the only repeating units in the polymer and has a hydroxyl functionality, mainly or essentially in the form of $-CH_2CH(CH_2Cl)OH$, of up to 4 or more. The product is generally normally liquid and has a number average molecular weight, for example, of 500 to 10,000, and a relatively narrow molecular weight distribution or low polydispersity, which is generally less than 1.5, preferably less than 1.2, e.g. less than about 1.5 for a 2000 molecular weight product and even less than about 1.2 for such product if the co-catalyst is used. The polyepichlorohydrin product contains only a relatively minor amount, e.g. less than 2 weight percent, per 1000 molecular weight of product, of low molecular weight, non-hydroxyl functional, cyclic ether oligomers which generally have 2 or 4 epichlorohydrin units cyclized, or essentially none of such oligomer if said co-catalyst is used. And the product is light colored, e.g. with a Gardner color of less than 2.

The process is outlined in the following equation where $R(OH)_m$ represents the initiator.

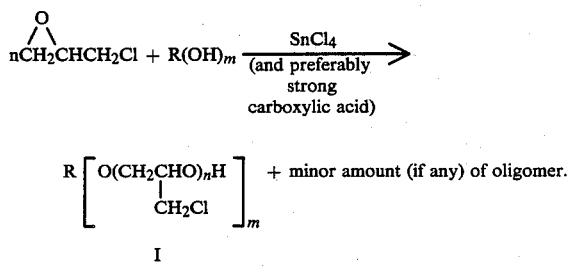

$$R \left[ \begin{array}{c} O(CH_2CHO)_nH \\ | \\ CH_2Cl \end{array} \right]_m + \text{minor amount (if any) of oligomer.}$$

I

In the above equation, R is an organic radical, e.g. containing 1 to 20 carbon atoms, such as an aliphatic radical or aromatic radical or combination of such radicals, which can contain or be substituted with moieties that are unreactive with epichlorohydrin or desired product and do not adversely affect the polymerization or desired product, such as halo, oxy, carbonyl, or combinations of such moieties, e.g., ester. For example, R can be $CH_3-$, $ClCH_2CH_2-$, $CH_3CH_2CH_2CH_2-$, $C_6H_5CH_2-$, $CH_2C_6H_{10}CH_2-$, $-(CH_2)_x-$ where x is 3–8, $-CH(R'')CH(R')-$ and $-CH(R')CH_2CH(R')-$ where $R'$ is selected from H and a lower alkyl, such as $CH_3-$, $CH_2Cl-$, and $C_2H_5-$, and $R''$ is said lower alkyl,

where x+y is 1 to 20, —CH$_2$C$_6$H$_4$CH$_2$—, and CH$_3$C(CH$_2$—)$_3$. The subscript m is 1, 2, 3 or 4, and n is at least 2 and, where R has a molecular weight of less than 1000, n is a number such that the polyepichlorohydrin, i.e. poly(chloromethylethyleneoxy), portion of the product is the major portion of the product by weight, n generally being 2 to about 100.

Polyglycidyl azide polymer derivatives, described hereinafter, of the polyepichlorohydrin polymers can be represented by a formula like "I" in the above equation except that Cl is replaced by N$_3$. Such derivatives will generally have approximately the same low polydispersity and low oligomer content as the polyepichlorohydrin precursor.

The strong carboxylic acid used as a co-catalyst generally increases the polymerization reaction rate as compared to the reaction rate obtained when it is not used, i.e. when just the stannic chloride catalyst is used; for example, the time for complete conversion at 65–70 °C. of the epichlorohydrin is reduced from about 24 hours to 1 hour when the co-catalyst is used with the stannic chloride. The use of the co-catalyst with the stannic chloride also allows a lower amount of stannic chloride catalyst to be e.g. to about ⅓ the amount. And the use of the co-catalyst, which speeds up the reaction rate, still generally results in a hydroxyl-terminated polyepichlorohydrin reaction product of light color, e.g. a Gardner color of less than 2, and low polydispersity, and with lower amounts, if any, of the cyclic ether oligomers as compared to when the stannic chloride is used as the only catalyst.

The initiators used in the process of this invention are those which are unreactive with the stannic chloride. Representative illustrative initiators which can be used include monohydric aliphatic alcohols, such as CH$_3$OH, C$_2$H$_5$OH, (CH$_3$)$_2$CHOH, CH$_3$(CH$_2$)$_3$OH, ClC$_2$H$_4$OH, and CH$_3$(CH$_2$)$_{16}$CH$_2$OH, monohydric cycloaliphatic alcohols, such as C$_6$H$_{11}$CH$_2$OH, polyhydric aliphatic alcohols, such as CH$_2$(CH$_2$OH)$_2$, HOCH$_2$CH(CH$_3$)OH, C$_2$H$_4$(CH$_2$OH)$_2$, HOCH$_2$CH(CH$_2$Cl)OH, and CH$_3$CH(OH)C$_2$H$_4$OH, aromatic alcohols, such as C$_6$H$_5$CH$_2$OH, and polyhydric cycloaliphatic alcohols, such as

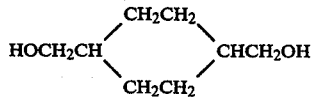

and the hydroxyl-containing organic compounds disclosed in said U.S. Pat. No. 2,327,053 which are unreactive with stannic chloride.

Initiators which are polymeric in nature can also be used, such as a low molecular weight hydroxyl-functional polyepichlorohydrin, hydroxyl-functional poly(ethyleneterephthalate), hydroxyl-functional perfluoropoly(oxyalkylene), such as HOCH$_2$CF$_2$O(CF$_2$O)$_x$(CF$_2$CF$_2$O)$_y$CF$_2$CH$_2$OH, hydroxyl-functional poly(oxyethylene), and hydroxyl-functional poly(oxypropylene). Other hydroxyl-containing organic monomeric or polymeric materials which can be used are those disclosed in said U.S. Pat. No. 4,431,845 which are unreactive with stannic chloride. Fluoroaliphatic alcohols which can be used are those such as C$_8$F$_{17}$SO$_2$N(C$_2$H$_5$)CH$_2$CH$_2$OH and C$_8$F$_{17}$SO$_2$N(CH$_2$CH$_2$OH)$_2$, and those disclosed in said U.S. Pat. No. 4,340,749 which are unreactive with stannic chloride.

Mixtures of such initiators also can be used.

The applicability of an alcohol or hydroxyl-containing organic material as an initiator for purposes of this invention can be simply determined by mixing 1 part of anhydrous stannic chloride with 5 to 10 parts of the hydroxyl material in about 30 parts of 1,2-dichloroethane solvent, heating the resulting mixture, e.g. 70° C. for 1 hour, and observing whether an irreversible reaction occurs, for example by evidence of a precipitate or evolution of hydrogen chloride. If no such reaction occurs, the hydroxyl material can be used as an initiator. Materials which have been found to be so reactive, and thus not suitable as an initiator, include ethylene glycol.

Where the stannic chloride is used in the process of this invention without the co-catalyst, 1,4-butane diol is not a preferred initiator since the use of the diol results in appreciable amounts of oligomer (see Example 5).

By controlling the proportions of epichlorohydrin to initiator, it is possible to limit the degree of polymerization and, consequently, the molecular weight of the polyepichlorohydrin product of the invention. Thus, the molar ratio of epichlorohydrin to hydroxyl group in the initiator may be in the range of about 2:1 to 100:1.

The stannic chloride catalyst employed in the process is a hydrolyzable compound in the presence of water. Furthermore, its catalytic activity is considerably impaired when it is in a hydrolyzed condition and larger amounts of such catalyst are required to effect the polymerization reaction when the reactants contain appreciable amounts of water as compared to when they are substantially dry. Also, the hydrogen chloride liberated by the hydrolysis of the stannic chloride may combine with the epichlorohydrin to form chlorohydrin by-products which may undesirably act as initiators. It is therefore preferable that the reactants used in the process of the invention be in substantially anhydrous condition.

The amount of stannic chloride catalyst to be used in the process of this invention without the co-catalyst is that amount sufficient to result in generally substantially quantitative or preferably essentially complete conversion of the epichlorohydrin to the polyepichlorohydrin product, and the amount of stannic chloride to be used will depend on the desired molecular weight of such product. Generally, for a product having a desired molecular weight of about 2000, such amount of stannic chloride will be about 0.5 to 1 weight percent of the polymerization reaction mixture; for a product with a molecular weight of 4000, such amount of stannic chloride will be about 1 to 2 weight percent; and for a product with a molecular weight of 1000, such amount will be about 0.25 to 0.5 weight percent.

As discussed above, the preferred process of this invention employs a strong carboxylic acid as a co-catalyst. Where such co-catalysts are used, 1,4-butane diol can be used as initiators without resulting in the formation of appreciable amounts of the cyclic oligomer.

Generally, the strong carboxylic acid co-catalyst used in this invention are those having a pK$_a$ of less than 2 and preferably less than 1, as determined, for example, by the method described by W. Huber, "Titration in Nonaqueous Solvents," Academic Press, New York, N.Y., 1967, p. 215. A class of such acid co-catalysts can be independently selected from the group consisting of chlorine and fluorine, and R is hydrogen, fluorine, chlorine, or a moiety which is electron-withdrawing relative to hydrogen), e.g. —$C_2F_5$ and —$C_6H_5$, and does not adversely affect the polymerization. Representative co-catalysts (and their $pK_a$ values) include trifluoroacetic acid (0.23), trichloroacetic acid (0.66), and dichloroacetic acid (1.25).

The amount of co-catalyst used in this invention is that which, together with the stannic chloride catalyst, is sufficient to minimize the formation of the cyclic ether oligomeric by-products. Such amount generally will also, as compared to using the stannic chloride as the sole catalyst, increase the reaction rate and permit use of less stannic chloride. Generally, the molar ratio of stannic chloride to co-catalyst will be 1:0.5 to 1:10, preferably 1:3 to 1:5, higher amounts of the co-catalyst in these ranges acting significantly as an initiator and thus influencing the molecular weight of the polyepichlorohydrin product.

The process of this invention can be carried out in the presence of a solvent or inert diluent, for example where the alcohol initiator is a solid, suitable solvents for this purpose representatively including 1,2-dichloroethane, benzene, toluene, methylene chloride, and carbon tetrachloride. The catalyst(s) can be added to the reaction vessel containing the initiator and solvent and the epichlorohydrin can be then incrementally added. Prior to adding the epichlorohydrin, and during its addition and the ensuing reaction, the reaction vessel is heated or cooled to a desired polymerization temperature, e.g. about 0° C. to 110° C., preferably 65° to 75° C. The polymerization reaction is conducted under anhydrous conditions and to that end a slow, dry nitrogen gas purge of the reaction vessel can be used. The reaction pressure is generally the autogenous pressure but superatmospheric pressures can be used, e.g. up to 10 atmospheres, where the more volatile initiators are used.

Generally, completion of the reaction will be indicated by the cessation of the reaction exotherm and the leveling-off of the viscosity increase of the reaction mixture. Completion of the reaction can be verified by measuring the weights of reaction mixture samples before and after they are heated to remove volatile materials.

The resulting secondary hydroxyl-terminated polyepichlorohydrin product can be recovered by subjecting the reaction product mixture to reduced pressure to remove solvent and volatile material, e.g. unreacted epichlorohydrin, adding further solvent, and then extracting the non-volatile material with an extracting agent, such as aqueous organic solvent, e.g. alcohol such as methanol or a ketone such as acetone, containing ammonium hydroxide, or preferably a chelating agent for tin such as the tetrasodium salt of ethylenedinitrilotetraacetic acid, used in an amount of about 5 to 10 percent in excess of the equivalent amount necessary to complex with the stannic chloride and neutralize the acid co-catalyst (if present). The resulting two phases are separated, the heavier phase containing the desired polyepichlorohydrin product and the other phase being the aqueous organic solvent containing the chelating agent and catalysts. The product phase can be washed several additional times with aqueous organic solvent. The washed product can be stripped under reduced pressure.

The recovered polyepichlorohydrin product typically has a Gardner color of less than 2 and is lighter in color than the crude product. Such light-colored product is advantageous in that it indicates to a purchaser of it that it is of high purity and it can be used in applications (e.g. optics) where such light color is a requirement.

The conversion of the epichlorohydrin to the desired secondary hydroxyl-terminated polyepichlorohydrin product by the process of this invention is generally substantially quantitative and usually at least 95 percent based on the epichlorohydrin reactant, and typically 98 to 100 percent when the co-catalyst is used with the stannic chloride. The amount of the cylic oligomer by-product is a minor amount of the polyeipchlorohydrin product, generally less than 2 weight percent per 1000 molecular weight of product and, in the case where the co-catalyst is used with the stannic chloride, less than 0.5 weight percent per 1000 molecular weight of product.

The secondary hydroxyl-terminated polyepichlorohydrin products of this invention can be reacted with chain extension agents or crosslinking agents, such as polyfunctional compounds reactive with hydroxyl groups. For example, the products can be reacted with polyisocyanates, e.g., p-phenylene diisocyanate, 2,4- and/or 2,6-tolylene diisocyanates, in a conventional urethane reaction (e.g., see said U.S. Pat. Nos. 4,340,749 and 4,405,497) to form elastomeric polyurethanes useful as foams for upholstery, automobile bumpers, and high performance coatings, or reacted with tertiary amines to form water-soluble polymeric quaternary salts used as plating bath additives.

The polyepichlorohydrin products of this invention can also be reacted in a conventional manner with inorganic or metal azides, such as sodium azide, to form normally liquid, secondary hydroxyl-terminated polyglycidyl azide polymers used as energetic binders or plasticizers for solid gun propellants, for example by the procedures described in U.S. Pat. Nos. 4,268,450 (Frankel et al), 4,288,262 (Flanagan), 4,379,894 (Frankel et al), and 4,486,351 (Earl).

The low content of the cyclic oligomer by-product in the polyepichlorohydrin product of this invention is advantageously carried over to the derivatives thereof, such as polyglycidyl azide polymer derivative product, together with the relatively low polydispersity property, thus the derivatives will have mechanical or physical properties which enhance their use, e.g. as energetic propellant binders or plasticizers.

In using the polyglycidyl azide polymer derivative products for use in solid rocket propellants, they can be mixed with an optional liquid plasticizer and then with solid particulate oxidizer, polyisocyanate curing agent, optional other fuel components, bonding agents, processing aids, burn rate catalysts, cure catalysts, carbon black, and combustion stabilizers. The propellant ingredients can be blended in a slow speed, high-shear mixer until all the solid particles are wetted by the liquids in the system, the mixing optionally being carried out under vacuum to remove trapped air. The polyisocyanate curing agent is then added. An additional short mixing cycle is completed. The viscous, uncured propellant slurry can be transferred into a prepared rocket motor casing. The filled casing can then be slowly heated to the appropriate cure temperature (generally 55° to 80° C.) and held at that temperature until the urethane reaction has taken place and the liquid binder precursor is converted to a solid, elastomeric polyurethane matrix providing mechanical integrity, environmental protection, and a controlled burning surface to the resulting solid propellant. Such propellants can be used in aircraft starter cartridges and ducted rocket boosters, and as low signature propellants, minimum smoke propellant, and gun propellants.

Further details on the preparation of the abovedescribed polyurethanes and their use as binders for solid rocket propellants will be omitted in the interest of brevity, since the steps in preparing them are well-known, e.g. see U.S. Pat. No. 3,642,705 (Zollinger) whose disclosure is incorporated herein by reference for such purpose.

Objects and advantages of this invention are illustrated in the following examples.

EXAMPLE 1

To a 5-L, 3-neck flask equipped with an electric heating mantle, stirrer, thermometer, condenser, addition funnel, and gas inlet tube was added 273 g 1,2-dichloroethane solvent and 75.5 g 1,4-bis(hydroxymethyl)cyclohexane initiator. A slow, dry nitrogen gas purge was started and maintained throughout the reaction and solvent stripping operation. To the well-stirred solution heated to 65° C. was added, by means of a syringe, 15 g stannic chloride The heating mantle was removed and 2,652 g epichlorohydrin was added with stirring over a two-hour period while maintaining the reaction temperature at 65°-70° C. by controlling the rate of addition and the use of a water-ice bath. After the addition was complete, the reaction mixture was stirred at 65° to 70° C. for an additional 24 hours. A small, weighed sample of the reaction mixture was heated for 1 hour at 105° C. in a vented oven to remove volatile material, and the heated sample then weighed, the difference in weights indicating 98% conversion of epichlorohydrin to hydroxyl-terminated polyepichlorohydrin product. Solvents and volatile materials were removed at 65° C. under reduced pressure (5 torr) over a six-hour period. A small product sample (1A) was removed for analysis. The remainder of the crude product was dissolved in 600 g 1,2-dichloroethane, and 1500 g of a 10% aqueous methanol solution containing 30 g of ethylenedinitrilotetraacetic acid, tetrasodium salt, added, and the mixture stirred vigorously for two hours at 60° C. The mixture was cooled to room temperature and the lower phase of the two liquid phases was separated and extracted with 1500 g 10% aqueous methanol at 60° C. The phases were separated as before and the lower phase extracted again with 1500 g of 10% aqueous methanol at 60° C. The lower phase, which separated, was stripped of solvent and volatiles at 5 torr over a six-hour period to yield 2122 g of the purified, liquid polyepichlorohydrin diol having the following structure:

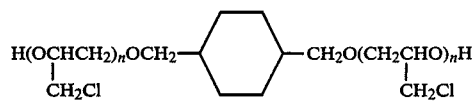

The molecular weight of the purified polyepichlorohydrin product was calculated to be 5200, based on the epichlorohydrin used. The molecular weight found was about 4000 (determined from equivalent weight by titration with phenyl isocyanate). Oligomer content of this purified polymer determined by gel permeation chromatography was 2.7 wt.% compared with 4.7 wt.% for the crude product (sample 1A above before purification).

EXAMPLES 2-7

Additional preparations of polyepichlorohydrin diol products of this invention, comprising liquid polyepichlorohydrin diols having structures within the scope of formula I, supra, where m is 2, were made following the general procedure of Example 1 and utilizing catalyst/initiator systems of this invention. The reagents employed and the molecular weights and cyclic oligomer content of the resulting products are shown in Table 1 below together with that of Example 1. Comparative Examples C-1 to C-5, employing prior art catalyst and initiators, are also included in Table 1.

TABLE 1

| Ex. | Epichlorohydrin, g | Catalyst Code[a] | g | Initiator Code[b] | g | Polyeipchlorohydrin diol product Mol. Wt.[c] Nominal | Found | Oligomer content,[d] wt. % |
|---|---|---|---|---|---|---|---|---|
| 1 | 2652 | A | 15 | BHMC | 75.5 | 5200 | 3940 | 4.7 |
| 2 | 2536 | A | 12 | BHMC | 165.3 | 2000 | 1876 | <0.5[e] |
| 3 | 1891 | A | 8 | PD | 22 | 6000 | 4928 | 6.4[f] |
| 4 | 1168 | A | 5.4 | PD | 8.4 | 9000 | 6686 | 8.4[g] |
| 5 | 1088 | A | 5.6 | BD | 22.5 | 4000 | — | 28.5[h] |
| 6 | 1157 | A | 5.3 | PD | 19 | 4000 | 3770 | 5.8 |
| 7 | 2674 | A | 15 | BHMC | 86.4 | 4000 | — | 3.0 |
| C-1 | 546 | B,C | 2.0,1.0 | PECH-D | 180 | 2000 | 2180 | — |
| C-2 | 2300 | B,C | 5.0,2,5 | PECH-D | 200 | 6000 | 3314 | 11.3 |
| C-3 | 1170 | B,C | 5.3,2.7 | EG | 6.9 | 9000 | 5926 | 13.6 |
| C-4 | 928 | B,C | 8.0,4.0 | BHMC | 72 | 2000 | — | 5.8 |

TABLE 1-continued

| Ex. | Epichloro-hydrin, g | Catalyst Code[a] | g | Initiator Code[b] | g | Polyeipchloro-hydrin diol product Mol. Wt.[c] Nominal | Found | Oligomer content,[d] wt. % |
|---|---|---|---|---|---|---|---|---|
| C-5 | 1157 | B,C | 5.3,2.7 | PD | 19 | 4000 | 3486 | 9.9 |

[a] A = $SnCl_4$, B = $(n-C_4H_9)_2Sn(C_6H_5)_2$, C = $(CF_3SO_2)_2CH(C_6H_5)$

[b] BHMC = HOCH$_2$— 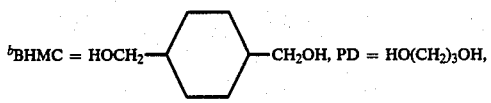 —CH$_2$OH, PD = HO(CH$_2$)$_3$OH,

BD = HO(CH$_2$)$_4$OH, EG = HOCH$_2$CH$_2$OH, PECH-D = a low mol. wt. polyepichlorohydrin polyol prepared as in Ex. 1 except no solvent was used and the following reagents were used: 896 g epichlorohydrin, 103 g ethylene glycol initiator, 2.0 g catalyst B, and 1.0 g catalyst C.

[c] Nominal or target mol. wt. is based on amounts of diol initiator and epichlorohydrin used; "Found" mol. wt. is two times the hydroxyl equivalent wt. determined by titration with phenyl isocyanate.

[d] Before extraction.

[e] "<0.5" signifies that no detectable amount of oligomer was observed by the gel permeation procedure used.

[f] After extraction, the oligomer content was 1.6 wt %. The extraction was carried out as in Example 1, except that ammonium hydroxide was used instead of the tetrasodium salt.

[g] After 3 extractions of the product with aqueous methanol, the oligomer content was <0.5 wt %.

[h] If the reaction of this example had included co-catalyst, the oligomer content would have been <0.5 wt %.

The lower "found" molecular weights for the diol products are believed due to small amounts of water (present in the epichlorohydrin monomer) which acts as an additional initiator and thus contributes to the lower "found" molecular weight value.

Table 1 shows the decreased amount of oligomer obtained using the $SnCl_4$ catalyst of this invention compared with a prior art catalyst system; this is shown by comparing products of similar molecular weights, viz. Ex. 2 vs. C-4, Ex. 6 vs. C-5, Ex. 3 vs. C-2, and Ex. 4 vs. C-3.

EXAMPLE 8

A. To a flask equipped as in Example 1 was added 40 g 1,2-dichloroethane, 7.2 g 1,4-bis(hydroxymethyl)cyclohexane, and 4.0 ml of a 1,2-dichloroethane solution containing 0.84 g $SnCl_4$ and 1.74 g $CF_3COOH$ co-catalyst. To this stirred solution was added 222.7 g of epichlorohydrin over a 35-minute period and the temperature was maintained at 65°–70° C. by cooling the flask. During the addition, the solution turned from clear to pink to blue and finally to a dark purple color. After an additional 30 min. of stirring at 65°–70° C., the reaction mixture was cooled to room temperature and a small sample (A1) was removed for analysis. The remainder of the reaction mixture was extracted with 100 g of a 10% aqueous methanol solution containing 2 g of the sodium salt of ethylenedinitrilotetraacetic acid and 0.5 g of concentrated aqueous $NH_4OH$, the extraction causing dissipation of the purple color. The resulting light-colored, organic phase was extracted with two 100 g portions of 10% aqueous methanol solution and then stripped of solvent and volatiles at 65°–70° C. and 5 torr over a 4-hour period to yield the liquid hydroxyl-terminated polyepichlorohydrin (A2) comprising polymer having a structure like that shown in Example 1.

B. The above reaction was repeated except the $CF_3COOH$ was omitted. At the end of the addition of epichlorohydrin, a considerable amount of it remained unreacted, so heating at 65° C. was continued for a total of 23 hours. After cooling to room temperature, a sample of the reaction mixture (B1) was removed for analysis. The remainder of the reaction mixture was extracted as above except that $NH_4OH$ was omitted in the first extraction. The washed organic phase was stripped of solvent as above to yield the liquid hydroxyl-terminated polyepichlorohydrin (B2) product comprising polymer having the structure shown in Example 1.

Analysis of the above polymeric products are summarized in Table 2.

TABLE 2

| Product | Hydroxyl equivalent weight | $M_n$[b] | $M_w$[b] | Poly-dispersity[c] | Oligomer content, wt. % |
|---|---|---|---|---|---|
| A1 | — | 1842 | 2201 | 1.19 | 0 |
| A2 | 1560 | 1934 | 2245 | 1.16 | 0 |
| B1 | — | 1861 | 2656 | 1.42 | 4.3 |
| B2 | 1870 | 1963 | 2595 | 1.32 | 2.8 |

[a] Determined by phenyl isocyanate titration.
[b] Determined by gel permeation chromatography (polypropylene glycol standard)
[c] $M_w/M_n$

EXAMPLE 9

Example 8A was repeated except that quantity of initiator (14.4 g) and one-half the amount of catalyst solution (2.0 ml) were employed. The epichlorohydrin addition took 1 hour; the dark purple color of the reaction mixture changed to a pale yellow near the end of the addition. Samples of the polyepichlorohydrin product taken after reaction (Ex. 9-1) and after extraction and stripping (Ex. 9-2) were analyzed. The results are summarized in Table 3.

TABLE 3

| Example | Hydroxyl equivalent weight | $M_n$ | $M_w$ | Poly-dispersity | Oligomer content, wt. % |
|---|---|---|---|---|---|
| 9-1 | — | 1420 | 1553 | 1.094 | 0 |
| 9-2 | 910 | 1462 | 1604 | 1.096 | 0 |

EXAMPLES 10-19

These examples describe the results of employing various dihydroxy initiators with the tin tetrachloride/trifluoroacetic acid catalyst system in polymerizing epichlorohydrin (in 25 g 1,2-dichloroethane) according to this invention following the general procedure of Example 8A. In each example, the reaction was carried out by adding the epichlorohydrin over a 30-min. period and at 70° C. for 1 hr. The reactants, amounts, approximate conversion, and product analyses are summarized in Table 4. The liquid diol polymers of each example had structures falling within the scope of formula I, supra.

TABLE 4

| | EXAMPLE | | | |
|---|---|---|---|---|
| | 10 | 11 | 12 | 13 |
| Reaction mixture | | | | |
| Initiator (0.10 mole), g | | | | |
| HOCH₂—⌬—CH₂OH | 14.4 | | | |
| HO(CH₂)₃OH | | 7.6 | | |
| HO(CH₂)₄OH | | | 9.0 | |
| HOCH₂CH(CH₃)OH | | | | 11.0 |
| SnCl₄, g | 0.63 | 0.84 | 0.63 | 0.63 |
| CF₃COOH cocatalyst, g | 1.36 | 1.82 | 1.36 | 1.36 |
| Epichlorohydrin, g | 242 | 249 | 248 | 246 |
| Color of reaction mixture | purple | pink | pink | tan |
| Conversion, wt % | 100 | 100 | 100 | 100 |
| Product analysis | | | | |
| Hydroxyl equivalent wt.ᵃ | 1530 | 1330 | 1540 | 1410 |
| $M_n{}^a$ | 1350 | 1360 | 1400 | 1540 |
| $M_w{}^a$ | 1530 | 1560 | 1700 | 1720 |
| Polydispersity, $M_w/M_n$ | 1.14 | 1.14 | 1.22 | 1.12 |
| Oligomer content before extraction, wt. % | 0 | 0 | 0 | 0 |

ᵃValues given are those after extraction. Extracting agent used was like that used in Example 1.

The results show that 1,3-propanediol, 1,2-propanediol, and 1,4-butanediol (Examples 11–13) are as effective as 1,4-bis(hydroxymethyl)cyclohexane (Example 10) as initiators in the polymerization of epichlorohydrin in high yields to a polyepichlorohydrin product free of oligomer and having a low polydispersity. However, under the same reaction conditions, using ethylene glycol instead of such initiators, a low yield (18%) of polyepichlorohydrin product resulted.

EXAMPLE 14

This example describes the preparation of a nominally 4000 molecular weight polyepichlorohydrin product following the general procedure of Example 8A employing 60 g 1,2-dichloroethane, 3.3 g 1,4-bis(hydroxymethyl)cyclohexane, 7 ml of a 1,2-dichloroethane solution containing 1.47 g tin tetrachloride, 3.05 g trifluoroacetic acid, and 213 g of epichlorohydrin. The reaction time was 1.5 hours at 70° C. (98% conversion). The reaction mixture was extracted with an aqueous methanol solution as in Example 8A and the polyepichlorohydrin product was isolated and upon being analyzed the hydroxyl equiv. wt. found to be 1770, $M_n$ was 2010, $M_w$ was 2550, and polydispersity was 1.27. There was little if any oligomer in the product as indicated by gel permeation chromatography (no more than about 1% in any case). Proton nmr of the product indicated about 7% primary hydroxyl groups due to some polymer chains being initiated by trifluoroacetic acid which was later removed in the isolation procedure.

EXAMPLE 15

This example describes the preparation of a low molecular weight polyepichlorohydrin having only one hydroxyl group at the end of each polymer chain by using a monohydroxy initiator molecule. The procedure followed was that of Examples 11–13, employing 25 g 1,2-dichloroethane, 40.3 g 2-chloroethanol initiator, 3 ml of a 1,2-dichloroethane solution containing 0.63 g tin tetrachloride and 1.36 g trifluoroacetic acid, and 210 g of epichlorohydrin. The reaction conditions were 1 hour at 70° C. (97% conversion). The reaction mixture was extracted with 100 g of a 20% aqueous methanol solution containing 4 g of ethylenedinitrilotetraacetic acid, tetrasodium salt. The liquid polyepichlorohydrin product comprises a mono-secondary hydroxyl-terminated polyepichlorohydrin polymer having a structure falling within the scope of formula I, supra, where m is 1. The product was isolated and analysis showed the hydroxyl equiv. wt. was 650, $M_n$ was 430, $M_w$ was 480, and polydispersity was 1.11. There was no oligomer indicated by gel permeation chromatography.

EXAMPLE 16

This example describes the preparation of the glycidyl azide polymer derivative of a polyepichlorohydrin product of this invention.

One hundred grams of the polyepichlorohydrin product prepared like that of Example 2, dissolved in 100 g of dimethylsulfoxide (DMSO), was added to a stirred slurry of 100 g of sodium azide in 230 g of DMSO. The mixture was heated to 80° C. and maintained at that temperature for 24 hours and decanted from the precipitated salts into an equal volume of cold water. The decanted mixture was heated to 80° C. and stirred for 2 hours, the phases allowed to separate, the aqueous phase discarded, and the water washing repeated twice more. Then 120 g of 1,2-dichloroethane was added to the washed product and the resulting solution was washed three times with 600 g portions of water. The separated organic phase was stripped at 40°–50° C. and 5 torr with a slow N₂ purge for 6 hours, to yield a hydroxyl-terminated polyglycidyl azide polymer product having the structure

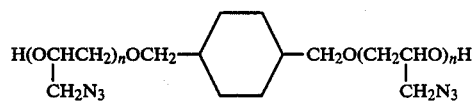

About 1 ml of the above azide polymer product was placed in a deflagrating spoon and held just above a Bunsen burner flame, whereupon it rapidly (in a matter of a few seconds) disappeared in a red-glowing fireball with a "woof" sound. This shows that the product is energetic and indicates that it would be useful in preparing a polyurethane binder for solid rocket propellants.

EXAMPLE 17

The polyepichlorohydrin product (10.6 g) of Example 2 was mixed at room temperature with 2 g of a polyisocyanate, DESMODUR N-100, and 1 drop of a urethane catalyst, dibutyltin dilaurate. The mixture gelled to yield a polyurethane elastomer.

A sample of the polyurethane elastomer immersed in heptane in a closed bottle did not appear to gain weight over a period of months, showing that it could be used to form solvent resistant articles, such as floor coverings, gaskets, and hoses.

EXAMPLE 18

The polyglycidyl azide polymer product of Example 16 (11 g) was mixed at room temperature with 2 g of DESMODUR N-100, and 4 drops of dibutyltin dilaurate. The curable mixture gelled in 137 minutes to yield a polyurethane elastomer. A small piece of the cured elastomer was held with tweezers just above the flame of a burning wooden match, whereupon it partially vaporized without charring; the evolved vapors extinguished the flame. This indicates the utility of the elastomer as an energetic binder for solid rocket propellants.

A film coating of the curable mixture in 1,2-dichloroethane was prepared and allowed to cure upon standing. The resulting cured coating could be removed by hot air from an electric heat gun substantially without damaging the polyester film substrate upon which the curable mixture was cast. This shows the polyurethane elastomer is useful as a thermally releasable coating.

Various modifications and alterations of this invention will become apparent to those skilled in the art without departing from the scope and spirit of this invention.

What is claimed is:

1. A polyepichlorohydrin product having a number average molecular weight of at least 2000 and a polydispersity of less than 1.2, said product comprising predominantly secondary hydroxyl-terminated polyepichlorohydrin polymer and essentially no non-hydroxyl functional cyclic ether oligomer, said product being made by polymerizing epichlorohydrin in the presence of anhydrous stannic chloride catalyst, a strong carboxylic acid co-catalyst, and an alcohol as an initiator.

2. The product of claim 1 wherein said product is normally liquid, has a Gardner color of less than 2, and said polyepichlorohydrin polymer is represented by the formula

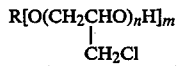

where R is an organic radical, m is 1 to 4, and n is at least 2.

3. The product of claim 2, where R has 1 to 20 carbon atoms and is an aliphatic radical, a cycloaliphatic radical, an aromatic radical, or combination of such radicals, m is 2, and n is 2 to 100.

4. The product of claim 2 where R is

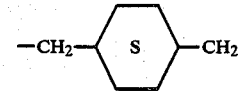

and m is 2.

5. The product of claim 2 wherein R is —(CH$_2$)$_3$—, —(CH$_2$)$_4$—, or —CH$_2$CH(CH$_3$)—, and m is 2.

6. The product of claim 2 wherein R is ClCH$_2$CH$_2$— and m is 1.

7. The product of claim 1 wherein said polyepichlorohydrin polymer has repeating units consisting of chloromethylethyleneoxy units.

8. A process for the preparation of the polyepichlorohydrin product of claim 1, which comprises polymerizing epichlorohydrin in the presence of anhydrous stannic chloride catalyst, a strong carboxylic acid co-catalyst, and an alcohol as an initiator.

9. The process according to claim 8 wherein the product of the process is extracted with an aqueous organic solvent solution containing a chelating agent for tin, separating the resulting two phases, and recovering the polyepichlorohydrin product from the heavier phase.

10. The process according to claim 9 wherein said chelating agent is the tetrasodium salt of ethylenedinitrilotraacetic acid.

11. The process according to claim 8 wherein said strong carboxylic acid, has a pK$_a$ of less than about 2, as a co-catalyst.

* * * * *

UNITED STATES PATENT AND TRADEMARK OFFICE
CERTIFICATE OF CORRECTION

PATENT NO. : 4,879,419

DATED : November 7, 1989

INVENTOR(S) : Birger Johannessen

It is certified that error appears in the above-identified patent and that said Letters Patent is hereby corrected as shown below:

Col. 1, line 58, "$\overline{MHD}_w$" should read --$\overline{M}_w$--.

Col. 1, line 59, "$\overline{MHD}_n$" should read --$\overline{M}_n$--.

Col. 2, line 11, "SnCl4" should read --$SnCl_4$--.

Col. 3, line 29, "to be e.g." should read --to be used, e.g.--.

Col. 5, line 2, "be independently" should read --be represented by the formula R-CXY-COOH, where X and Y are independently--.

Col. 10, line 39, "that quantity" should read --that twice the quantity--.

Col. 14, lines 32-33, "ethylenedinitrilotraacetic" should read --ethylenedinitrilotetraacetic--.

Signed and Sealed this

Twenty-eighth Day of January, 1992

Attest:

HARRY F. MANBECK, JR.

*Attesting Officer*     *Commissioner of Patents and Trademarks*